United States Patent
Watanabe et al.

(10) Patent No.: US 8,223,599 B2
(45) Date of Patent: Jul. 17, 2012

(54) INFORMATION RECORDING/REPRODUCTION APPARATUS, INFORMATION RECORDING METHOD AND INFORMATION RECORDING MEDIUM

(75) Inventors: Akinobu Watanabe, Yokohama (JP); Tsutomu Usui, Tokyo (JP); Hiroyuki Marumori, Yokohama (JP); Toshihiro Kato, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 374 days.

(21) Appl. No.: 12/078,310

(22) Filed: Mar. 28, 2008

(65) Prior Publication Data

US 2009/0040890 A1 Feb. 12, 2009

(30) Foreign Application Priority Data

Aug. 9, 2007 (JP) .................... 2007-208636

(51) Int. Cl.
 *G11B 7/004* (2006.01)
(52) U.S. Cl. ............... 369/30.04; 369/47.55; 369/275.3
(58) Field of Classification Search .................. None
 See application file for complete search history.

(56) References Cited

U.S. PATENT DOCUMENTS 7,532,549 B2 * 5/2009 Park et al. ............... 369/30.04
2005/0234994 A1 * 10/2005 Nakamura et al. ......... 707/104.1
2006/0092785 A1 * 5/2006 Takashima et al. .......... 369/47.1
2006/0092794 A1 5/2006 Takashima et al.
2007/0143328 A1 * 6/2007 Green et al. .................. 707/101
2008/0025192 A1 * 1/2008 Ijtsma et al. ............... 369/275.3

FOREIGN PATENT DOCUMENTS

| JP | 2005-243079 | 9/2005 |
| JP | 2006-127700 | 5/2006 |
| WO | WO 2006/006086 | 1/2006 |

OTHER PUBLICATIONS

Japanese Office Action, issued in Japanese Patent Application No. 2007-208636, dated Oct. 18, 2011.

* cited by examiner

*Primary Examiner* — Wayne Young
*Assistant Examiner* — Brian Butcher
(74) *Attorney, Agent, or Firm* — McDermott Will & Emery LLP

(57) ABSTRACT

Provided is a recording/reproduction apparatus capable of securing a backup area for management information on a recording medium without affecting the capacity of a user data area. Before a hard disk drive or a disc medium (recording medium) is finalized, metadata is recorded in a metadata area and when the hard disk drive or the disc medium are finalized, a user data area portion corresponding to the volume of metadata required for the finalizing is set as a metadata mirror area and then the metadata recorded in the metadata area is copied to the metadata mirror area.

14 Claims, 4 Drawing Sheets

INFORMATION RECORDING/REPRODUCTION APPARATUS, INFORMATION RECORDING METHOD AND INFORMATION RECORDING MEDIUM

CROSS-REFERENCES TO RELATED APPLICATIONS

This application relates to and claims priority from Japanese Patent Application No. 2007-208636, filed on Aug. 9, 2007, the entire disclosure of which is incorporated herein by reference.

BACKGROUND

1. Field of the Invention

The invention relates generally to an information recording medium such as a BD-R, an apparatus for recording/reproducing information to/from the information recording medium, and a method for recording information on the information recording medium.

2. Description of Related Art

UDF (Universal Disk Format) is known as a format for recording and managing files in optical discs typified by DVDs and BDs Blu-Ray Disc.

Reference 1 proposes a recording/reproduction apparatus that records a file on a recording medium in accordance with UDF 2.5 (see reference 1: JP 2005-243079 A).

File systems having UDF2.5 relating to rewritable recording media such as BD-REs (Blu-ray Disk Rewritable) makes management information redundant when recording it on a recording medium, and concentrates the managed information in a recording area on the recording medium.

The management information shows where on a recording medium a file exists and what kind of file it is. When metadata (management information) is updated as a result of additional writing for user data on the recording medium, an optical disc drive records the metadata (MD) in a metadata area (a first management area). In addition, in order to make this metadata redundant, the optical disc drive records the metadata file also in a metadata mirror area (a second management area). Backup data the same as the metadata is recorded in the metadata mirror area.

The metadata mirror area is provided separately from the metadata area on the recording medium. For example, conventionally, the metadata area is arranged on an inner circumferential side on an optical disc, while the metadata mirror area is arranged on an outer circumferential side.

Accordingly, even if the meta data area is damaged or deteriorates, the drive can read the metadata from the metadata mirror area and access a target file.

Concentrated placement for management information means recording one piece of management information continuously without dividing it. This enables the optical disc drive to read the management information quickly, so it can access a target file in a short time period.

In addition, a file format having UDF 2.6 relating to a write-once recording medium such as BD-Rs (Blu-ray Disc Recordable) has been proposed. In UDF 2.6, the management information is made redundant like in UDF 2.5.

The UDF 2.6 employs a pseudo over write method (POW: Pseudo Over Write) that enables a write-once recording medium to behave like a rewritable recording medium in relation to an information processing apparatus such as a host computer.

For example, if new metadata is to be recorded after certain metadata is recorded in a metadata area, the new metadata is alternately recorded in a second position next to a first position where the certain metadata has been recorded, instead of recording the new metadata in the position where the certain metadata has been recorded (i.e., overwriting). Link information for the first position and the second position is recorded in a defect list management area provided separately from the metadata area. This link information is likewise provided in the metadata mirror area.

In UDF 2.6, when an optical disc is formatted, the maximum size of the metadata area (e.g., 450-plus MB) is secured, and at the same time, the metadata mirror area having the same capacity as the maximum size of the metadata has to be recorded regardless of the actual size of the metadata recorded in the metadata area, in order to realize the above-described POW method.

As a result, considerable storage capacity is consumed for recording the management information on the recording medium, so the capacity of the area for recording user data will decrease.

In light of the above problem, it is an object of this invention to provide a recording/reproduction apparatus capable of securing a management information backup area on a recording medium without affecting the capacity of a user data area.

SUMMARY

In order to achieve the above object, provided according to an aspect of this invention is a recording/reproduction apparatus that sets a size for a management information backup area based on the actual size for the management information stored in a management area on a recording medium.

This invention can provide a recording/reproduction apparatus capable of securing a management information backup area on a recording medium without affecting a capacity for a user data area.

Other aspects and advantages of the invention will be apparent from the following description and the appended claims.

DETAILED DESCRIPTION OF PREFERRED EMBODIMENTS

Figure 1:
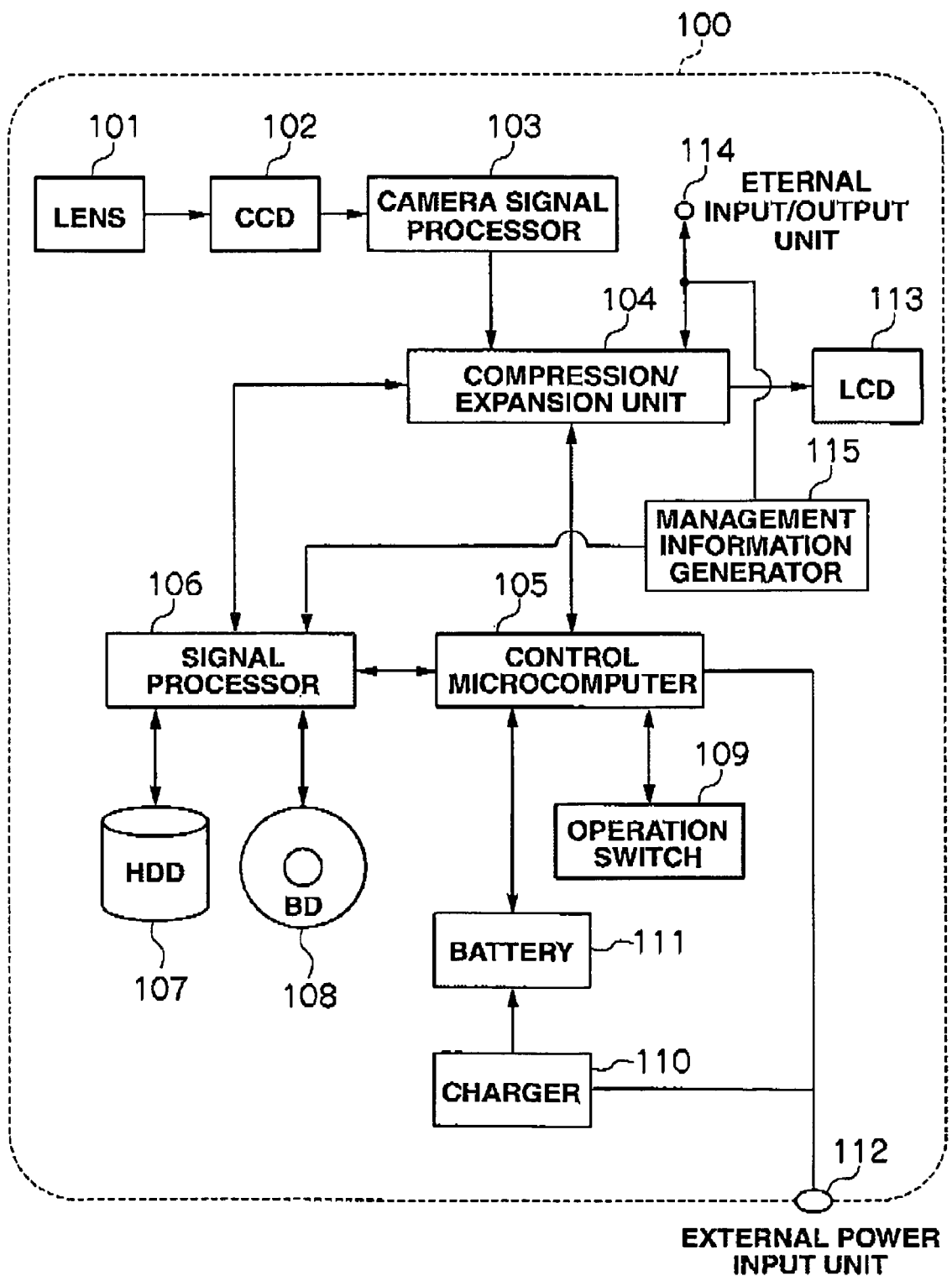
FIG. 1 is a block configuration diagram showing an information recording/reproduction apparatus according to this embodiment.

FIG. 1 shows an information recording/reproduction apparatus 100 according to this invention. A preferred example for this information recording/reproduction apparatus is a video camera. The information recording/reproduction apparatus constitutes an information recording/reproduction system together with a recording medium to be described later.

The information recording/reproduction apparatus 100 includes a lens 101, an imaging sensor (CCD) 102, a camera signal processor 103, a compression/expansion unit 104), a control microcomputer 105, a signal processor 106, a hard disk drive (HDD) 107, a disc medium (e.g., a BD and a DVD) 108, an operation switch 109, a power charger 110, a battery 111, an external power input unit 112, a liquid crystal display (LCD) 113, an external output interface (I/F) 114 and a management information generator 115.

The information recording/reproduction apparatus 100 catches an object image with the CCD 102 via the lens 101, converts the image caught by the CCD 102 into an electric signal and then converts the electric signal into a video signal with the camera signal processor 103.

Then the video signal output from the camera signal processor 103 is converted into a digital video signal in the signal compression/expansion unit 104 controlled by the control microcomputer 105. Also, by switching the input to the external input/output terminal 114, an external input video signal can be converted into a digital video signal.

The signal converted to the digital video signal is recorded by the signal processor 106 in an external storage medium such as a BD, a DVD or an HDD. This is how data is recorded on, for example, a recording medium formatted under UDF2.6 such as a BD-R.

If metadata needs to be updated in response to additional writing for the user data, the management information generator 115 generates metadata and records the generated metadata in a metadata area.

In addition, data can be dubbed between recording media by the user controlling the control microcomputer 105 via the operation switch 109 and the signal processor 106 reading the video signal recorded on the BD or DVD and recording it in the HDD. Likewise, the video signal recorded in the HDD can be read and recorded on the BD or DVD.

The signal recorded in the storage medium is expanded into a video signal by the video compression/expansion unit 104, output to the input/output terminal, and displayed on the liquid crystal display 113. Here, the display is not limited to the liquid crystal display 113, and other displays such as an organic EL display may be employed.

The external power input unit 112 is provided as a power source so power from the outside can be supplied. With the power supplied from the external power input unit 112, the battery 111 can be charged by the power charger 110. Accordingly, when the power is supplied from the external power input unit 12, the components are operated by power externally supplied, while when the external power is not supplied, the components are operated by power supplied from the battery 111. However, all functions required for the power charge are not necessarily incorporated in the apparatus, and a part or all the functions required for the power charge may be provided in addition to the external power input unit in the apparatus.

Next, a data structure from when data is placed on a BD-R (optical disc) in accordance with UDF 2.6 will be described.

Figure 2:
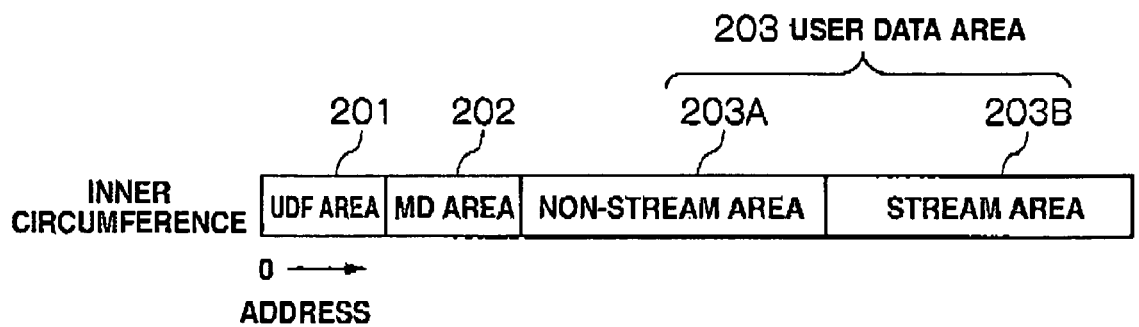
FIG. 2 is a diagram showing a data structure before a BD-R is finalized.

FIG. 2 shows the data structure of the BD-R before finalization. This data structure includes a plurality of sequential recording ranges (SRR), and a UDF area 201, etc. (to be described later) set for each SRR. In FIG. 2, the left side shows the inner circumferential side in the BD-R, while the right side shows the outer circumferential side in the BD-R. The left end in FIG. 2 corresponds to address 0.

The finalization is final processing performed for recording information so that data recorded to an optical disc can be reproduced in another apparatus. When a DVD having video data shot in a video mode is finalized, its format becomes the same as that for DVD software (such as movie software) and will able to be reproduced in a generally-use DVD player.

Once a write-once optical disc is finalized, no more data can be written. However, with a rewritable optical disc, data can be additionally written by releasing the finalization status.

The finalization for the BD-R according to this invention is performed by generating a movie object file (BD library management information), creating a metadata mirror and ending a session in order to make the BD-R non-rewritable. The movie object file is specified in a BD standard, and a procedure for scene reproduction is recorded as a command sequence in this movie object—e.g., a first scene is reproduced after the disc is inserted into the drive and then a second scene is reproduced—is recorded as a command sequence in this movie object file.

A configuration in which the movie object file is updated every time the drive 107 records a scene on the BD-R can be considered, but since the configuration increases the amount of data consumed and it takes a relatively long time to generate the movie object file, the movie object file is generated as one step in the finalization processing performed by the drive in response to a request from the user.

Since a BD-R with no movie object file does not meet the BD standard, if a non-finalized BD-R is inserted into another drive, the BD-R might not be reproduced properly.

Conventional DVD-Rs have been made non-rewritable by performing finalization and ending a session consisting of a plurality of SRRs. In BD-Rs, although the session does not have to be ended during the finalization, the session is ended after the finalization in order to prevent unwanted data writing from another apparatus. If the BD-R is left rewritable without ending the session, unwanted data can be written to it, so the reproduction of this BD-R in the BD camera cannot be ensured.

When the signal processor 106 in the signal processor 106 in the information recording/reproduction apparatus 100 formats the BD-R, a UDF area 201, a metadata (MD) area 202 and a user data area 203 are set from the inner circumference of the BD-R in the order mentioned. The user data area 203 includes a non-stream area 203A and a stream area 203B.

UDF data in a file format is recorded in the UDF area 201. The UDF data is a file for managing a volume structure for the disc, i.e., in which area the metadata is recorded.

Metadata in a file format is recorded in the MD area 202. The metadata is a file for managing a file structure for the user data in the user data area, e.g., a directory.

Figure 3:
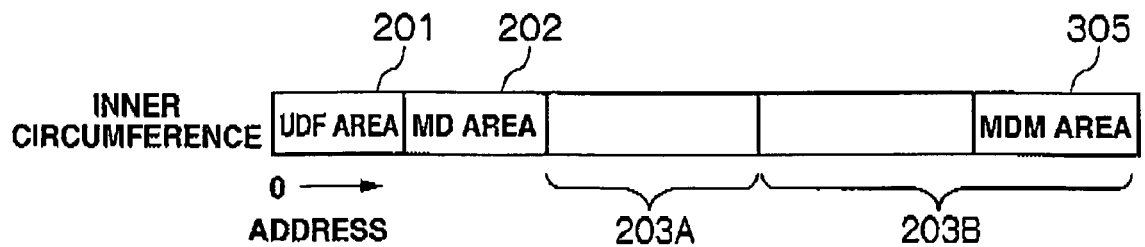
FIG. 3 is a diagram showing a data structure after the BD-R is finalized.

FIG. 3 shows the data structure of the BD-R after the finalization is performed. The data structure in FIG. 3 is different from the data structure in FIG. 2 in that the FIG. 3 structure includes a metadata mirror (MDM) area 305. The metadata mirror is backup information for the metadata, and so is the same as the metadata.

The information recording/reproduction apparatus 100 allocates a part of the stream area in the user data area 203 to this MDM area 305. The metadata mirror is recorded in the MDM area 305.

The information recording/reproduction apparatus 100 allocates the maximum size (e.g., 450-plus MB) for the MD area when formatting the BD-R, but the information recording/reproduction apparatus changes the size of the MDM area 305 in accordance with the volume of user data recorded in the user data area.

For example, the information recording/reproduction apparatus 100 determines the size of the MDM area 305 in accordance with the volume of metadata stored in the MD area 202 when finalizing the BD-R. Preferably, the information recording/reproduction apparatus 100 sets the size of the MDM area 305 to have the same size as the volume of the metadata stored in the MD area 202.

Figure 4:
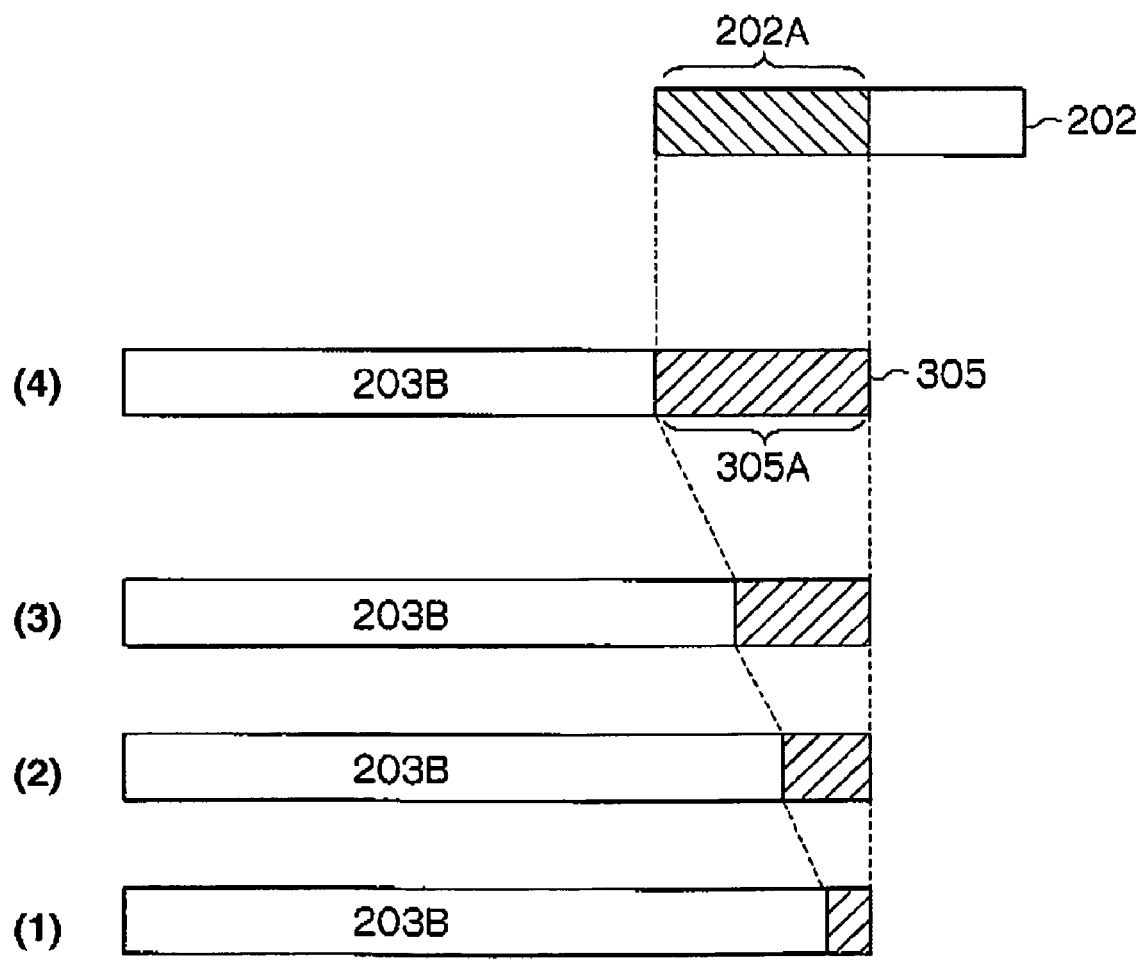
FIG. 4 is a diagram showing how the information recording/reproduction apparatus 100 determines the size for an MDM area formed in a stream area 203B.

FIG. 4 shows a principle for how the information recording/reproduction apparatus 100 determines the. MDM area formed in the stream area 203B. Every time the user records a scene in the user data area 203 in the BD-R, the information recording/reproduction apparatus 100 reduces the stream area 203B by an amount (shaded portion) corresponding to the size of the metadata corresponding to the recorded one scene of the user data.

Part (1) in FIG. 4 shows that the capacity of the stream area 203B is reduced when a first scene is recorded on the BD-R, part (2) in FIG. 4 shows that the capacity of the stream area 203B is further reduced when a second scene is recorded on the BD-R, part (3) in FIG. 4 shows that the capacity of the stream area 203B is further reduced when a third scene is recorded on the BD-R, and part (4) in FIG. 4 shows that a reduced portion 305A is reduced from the stream area 203B when the BD-R is finalized The capacity of the MDM area 305 is equal to the reduced portion 305A from the stream area 203 when the BD-R is finalized. The capacity 305A of the MDM area 305 is equal to metadata size 202A in the MD area 202. Accordingly, since the capacity 305A of the MDM area 305 increases as the amount of user data recorded on the BD-R increases, the information recording/reproduction apparatus can use the user data area on the BD-R more effectively compared to a configuration in which the MDM area having the same size as that of the entire MD area is set in the stream area 203B when formatted.

Next, the operation of the information recording/reproduction apparatus in this embodiment will be described with reference to the flowchart in FIG. 5. First, the control microcomputer 105 (control unit) records data in the user data area 203 on a recording medium via the signal processor 106 (S401), then generates an MD file (S402) and records the generated MD file in the MD area 202 (S403).

While recording the data on the recording medium, the control microcomputer 105 sequentially reduces the capacity of the stream area in order to allocate the reduced portion for the MDM area, i.e., expands the MDM area every time a scene is recorded (S403A), as explained above with reference to FIG. 4.

After recording the generated MD file in the MD area 202, the control microcomputer 105 judges whether or not finalization processing should be executed (S404), and if the finalization processing is determined to be not necessary (No), the microcomputer 105 returns to the data recording processing (S401) without copying the metadata file recorded in the MD area 202 in the MDM area. If further data recording is performed, the above processing is repeated.

Figure 5:
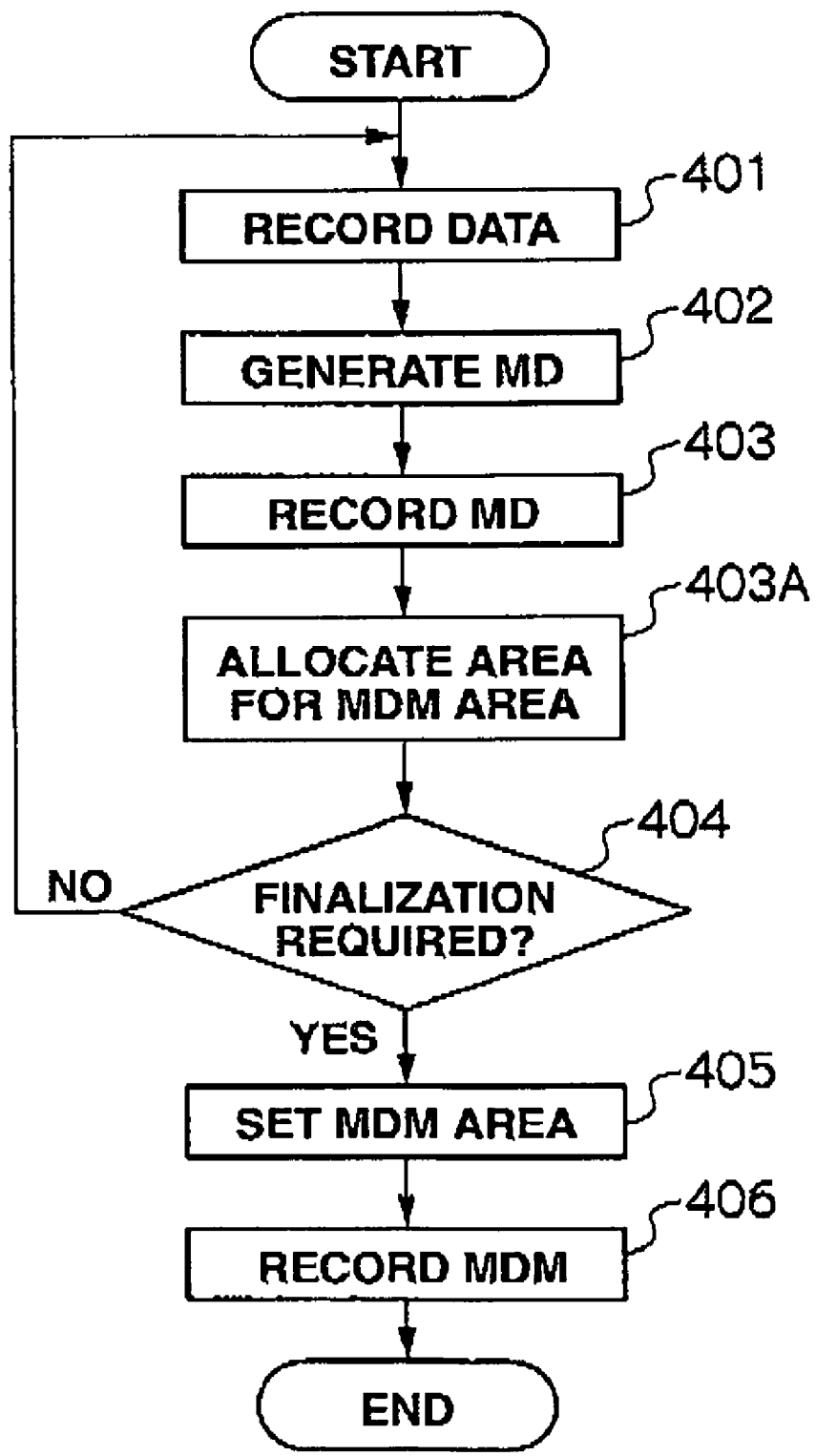
FIG. 5 is a flowchart explaining the operation of the information recording/reproduction apparatus.

If the information recording/reproduction apparatus receives a command from the user, the information recording/reproduction apparatus determines that the finalization processing is necessary (Yes) sets in the user data area an MDM area having the capacity required for copying the MD file in it (S405), records an MDM file, which is a copy for the MD file, in the set MDM area 305 (S406), and ends the routine according to FIG. 5. When reproducing data from the recording medium, the information recording/reproduction apparatus 100 can first access the metadata mirror in the MDM area instead of accessing the MD area.

Although the metadata mirror area corresponding to the metadata area (management area) is provided in the above embodiment, a mirror area for the UDF area may be provided on the recording medium. In such a configuration, a UDF mirror area having a certain capacity is set on the outer circumferential side in the stream area when the recording medium is formatted. The metadata mirror area is provided next to the UDF mirror area in the stream area.

The above-described defect list management area is provided on the inner circumferential side relative to the UDF area on the recording medium.

In the above embodiment, the information recording/reproduction apparatus may estimate the MDM area when the user records data on the recording medium.

With the configuration in which the user data area is divided into the non-stream area 203A and the stream area 203B and the capacity of the stream area 203B is made variable, the amount of free space in the stream area 203B can be easily calculated, and the accuracy for allocating a suitable capacity for the MDM area can be enhanced. In other words, if the estimated capacity of the MDM area is larger or smaller than the actually-required capacity, the capacity allocated for the MDM area can be sequentially adjusted while the information recording/reproduction apparatus records data on an optical disc.

While the invention has been described with respect to a limited number of embodiments, those skilled in the art, having benefit of this disclosure, will appreciate that other embodiments can be devised that do not depart from the scope of the invention as disclosed herein. Accordingly, the scope of the invention should be limited only by the attached claims.

What is claimed is:

1. An information recording/reproducing apparatus for recording information on a recording medium and reproducing information from the recording medium, the apparatus comprising:
    a recoding unit for recording information on the recording medium;
    a reproduction unit for reproducing information from the recording medium; and
    a control unit for controlling each unit in the information recording/reproduction apparatus, the control unit controlling the recording unit to:
    record user data on the recording medium;
    record management information for the user data on the recording medium;
    record UDF (Universal Disk Format) data on the recording medium;
    record UDF mirror information which is a copy of the UDF data in an area of a user data area of the recording medium; and
    record metadata mirror information which is a copy of the management information in an area of the user data area, which is next to the area where the UDF mirror information is recorded, wherein:
    when reproduction is performed, the metadata mirror information is reproduced from the recording medium before the management information, and
    the UDF mirror information includes information for an area where the metadata mirror information is recorded.

2. The information recording/reproducing apparatus according to claim 1, further comprising:
    a management information generator for generating the management information, wherein:
    the recording unit records the user data in a user data area of the recording medium, the management information in a first management area of the recording medium, and the metadata mirror information in a second management area of the recording medium which is the area next to the area where the UDF mirror information is recorded; and the control unit changes a size of the second management area in response to the recording of the management information in the first management area.

3. The information recording/reproducing apparatus according to claim 2, wherein the control unit sets the second management area on the recording medium in accordance with a volume of the management information recorded in the first management area.

4. The information recording/reproducing apparatus according to claim 3, wherein the control unit sets the second management area so that the second management area will have the same capacity as the volume of the management information recorded in the first management area.

5. The information recording/reproducing apparatus according to claim 2, wherein:
the control unit records the management information in the first management area until the recording medium is finalized; and
the control unit copies the management information recorded in the first management area to the second management area when the recording medium is finalized.

6. The information recording/reproducing apparatus according to claim 2, wherein the first management area is a metadata area in which metadata serving as the management information is recorded, and the second management area is a mirror area for the metadata area.

7. The information recording/reproducing apparatus according to claim 2, wherein the recording medium is a write-once Blu-ray disc, and the control unit records the management information and the user data on the Blu-ray disc using a file format based on UDF (Universal Disk Format) 2.6.

8. The information recording/reproducing apparatus according to claim 2, wherein the first management area is arranged on an inner circumferential side on the recording medium, and the second management area is arranged on an outer circumferential side on the recording medium.

9. The information recording/reproducing apparatus according to claim 1, wherein the control unit reduces, every time the user data is recorded in the user data area, a user data recordable capacity for the user data area sequentially by an amount corresponding to a volume of the management information corresponding to the user data.

10. The information recording/reproducing apparatus according to claim 9, wherein the control unit allocates the reduced amount of the user data recordable capacity as the capacity for the second management area.

11. The information recording/reproducing apparatus according to claim 9, wherein, every time the control unit records a scene in the user data area, the control unit sequentially reduces the user data recordable capacity.

12. The information recording/reproducing apparatus according to claim 1, wherein the second management area is set in a stream area in the user data area.

13. An information recording method for controlling the information recording/reproducing apparatus according to claim 1, the method comprising:
setting, based on an actual size for the management information recorded in the area of the recording medium, a size for the area where the metadata mirror information is recorded.

14. An information recording medium in which user data is recorded and from which the user data is reproduced by an information recording/reproducing apparatus, the recording medium comprising:
a user data area in which user data is recorded;
a first management area in which management information for managing the user data is recorded in response to the recording of the user data in the user data area; and
a second management area in which metadata mirror information which is a copy of the management information is recorded,
a first UDF (Universal Disk Format) area in which record UDF data is recorded; and
a second UDF area in which record UDF mirror information which is a copy of the UDF data is recorded, wherein:
the second management area is next to the second UDF area, within the user data area,
the UDF mirror information includes information for the second management area where the metadata mirror information is recorded, and
a size of the second management area is changed in accordance with the recording of the management information in the first management area by the information recording/reproduction apparatus.

* * * * *